(12) United States Patent
Cazeaux

(10) Patent No.: US 7,689,951 B2
(45) Date of Patent: Mar. 30, 2010

(54) DESIGN RULE CHECKING SYSTEM AND METHOD, FOR CHECKING COMPLIANCE OF AN INTEGRATED CIRCUIT DESIGN WITH A PLURALITY OF DESIGN RULES

(75) Inventor: Lionel Riviere Cazeaux, La Tronche (FR)

(73) Assignee: Freescale Semiconductor, Inc., Austin, TX (US)

( * ) Notice: Subject to any disclaimer, the term of this patent is extended or adjusted under 35 U.S.C. 154(b) by 387 days.

(21) Appl. No.: 11/574,496

(22) PCT Filed: Aug. 31, 2004

(86) PCT No.: PCT/EP2004/011076

§ 371 (c)(1),
(2), (4) Date: Feb. 28, 2007

(87) PCT Pub. No.: WO2006/024324

PCT Pub. Date: Mar. 9, 2006

(65) Prior Publication Data

US 2008/0320422 A1  Dec. 25, 2008

(51) Int. Cl.
*G06F 17/50* (2006.01)
(52) U.S. Cl. .............................. 716/5; 716/4
(58) Field of Classification Search ................ 716/4–5, 716/11, 19–21; 703/2
See application file for complete search history.

(56) References Cited

U.S. PATENT DOCUMENTS

| 5,671,333 | A  | * | 9/1997  | Catlett et al. ................. 706/12 |
| 6,049,822 | A  | * | 4/2000  | Mittal ........................ 709/217 |
| 7,280,945 | B1 | * | 10/2007 | Weiner et al. ................. 703/2 |
| 2004/0163061 | A1 |   | 8/2004  | Chevallier et al. |
| 2004/0221250 | A1 | * | 11/2004 | Bergman Reuter et al. ..... 716/4 |
| 2005/0251771 | A1 | * | 11/2005 | Robles ........................ 716/5 |

OTHER PUBLICATIONS

Ferguson et al; "Shifting Methods: Adopting a Design for Manufacture Flow"; IEEE 5th International Symposium on Quality Electronic Design, California, USA Mar. 2004, pp. 171-175.
Gupta et al; "Manufacturing-aware Physical Design"; IEEE/ACM International Conference on Computer Aided Design, 2003, pp. 681-687.
PCT International Search Report and Written Opinion correlating to PCT/EP2004/011076 dated Jun. 30, 2005.

* cited by examiner

*Primary Examiner*—Vuthe Siek

(57) ABSTRACT

In a design rule checking system for checking whether or not an integrated circuit design complies with design rules specifying limit values for respective geometric parameters, non-binary functions are used to model the way in which systematic yield loss varies with the value of the geometric parameters. This enables a value to be assigned to systematic yield loss in cases where the geometric parameter is compliant with the design rule but takes a value close to the design rule limit.

15 Claims, 7 Drawing Sheets

DESIGN RULE CHECKING SYSTEM AND METHOD, FOR CHECKING COMPLIANCE OF AN INTEGRATED CIRCUIT DESIGN WITH A PLURALITY OF DESIGN RULES

The present invention relates to the field of design of semiconductor integrated circuits and, more particularly, to the application of so-called "design for manufacturability" principles when designing such circuits.

As integrated circuit manufacturing technology has developed, and VLSI has increased the density of features on a wafer, the process of designing the circuits has become increasingly divorced from the process of manufacturing them, to the extent that separate businesses have grown up handling only the design process, or only the manufacturing process—this can be termed horizontal specialization. (Some companies handling the entire design-and-manufacture chain still exist (vertical integration)). Increasingly, the design of semiconductor integrated circuits is handled using computer-aided design (CAD) systems and, notably, employing electronic design automation (EDA) techniques.

FIG. 1 is a flow diagram outlining the main processes that are generally involved in current techniques for the design of a VLSI semiconductor integrated circuit, such as a system on a chip (SoC). It will be noted that, at various stages in the design procedure, checks are made to verify that the "design-in-progress" that has been developed so far is workable (i.e. it does not violate any important principles, e.g. no short-circuits between conductors, etc.).

In recent years it has been realised that it is important, at the design stage, to take into account the particularities of the processes that will be used to manufacture the integrated circuit. More particularly, it is desirable to design the integrated circuit so that the various processes involved in its manufacture are optimized, while at the same time ensuring low cost, acceptable product quality, reliability and safety, etc. This can be referred to as applying "design for manufacture" (DFM) techniques or principles. DFM includes aspects, for example, such as optical proximity correction (to account for difficulties that arise in photolithography when the feature sizes to be defined are smaller than the wavelengths being used to define them), the re-use of silicon building blocks that have been tried and tested in earlier designs, etc.

Typically, design for manufacturability principles are taken into account both when deciding on the various aspects of the circuit's design (e.g. architecture, layout, etc.) and when performing the various verifications of the design-in-progress.

When applying DFM techniques to the design of semiconductor integrated circuits, the designer is concerned to know how the various aspects of the circuit design affect the yield, that is, the percentage of final products which are useable. Different factors can introduce yield loss, and yield losses can be of different kinds: systematic yield loss, parametric yield loss, defect-induced yield loss, etc. Amongst other things, it is desirable to minimize systematic yield loss.

Often, a foundry will specify design rules that an integrated circuit designer must comply with in order to ensure a useable final product. Certain of these design rules relate to the geometry of the integrated circuit and specify an upper or lower limit value (or a range defined by two limit values) for a particular parameter defining the geometry at a feature, IP and/or circuit level.

For example, a first design rule could state that a particular feature on the integrated circuit must have a minimum length of X micrometers. Conventionally, it is assumed that the systematic yield loss will be 100% if this design rule is not complied with (i.e. yield=0%) and systematic yield loss will be 0% if this design rule is complied with (i.e. yield=100%). In other words, this design rule can be considered to be a "binary rule":

Feature size<limit set by design rule: yield =0%, and
Feature size>limit set by design rule: yield =100%.

Typically, in order for a designer to consider his design to be acceptable ("clean") from the point of view of DFM principles, he sets the limit (the "DFM value") of each relevant geometric parameter to a value that is a certain distance away from the limit (the "DRM value") specified by the applicable design rule. This safety margin will generally be a certain percentage, m, of the design rule limit value. Typically, this safety margin can take a value in the range from around 5% to around 200% depending upon the geometrical parameter in question and the electrical sensitivity/criticality of the design.

Thus, it can be considered that:

$$DFM \text{ limit value} = DRM \text{ limit value} \left(\frac{100+m}{100}\right)$$

if the DRM value is specifying a lower limit.
And $$DFM \text{ limit value} = DRM \text{ limit value} \left(\frac{100-m}{100}\right)$$

if the DRM value is specifying a lower limit.

FIG. 2 shows a graph illustrating how yield versus feature size is modelled according to a conventional type of design rule which specifies a lower limit for the size of a particular feature.

Typically, design rules of the above-described type are taken into account when verifying the feasibility of circuits or layout at the stages indicated by arrows in FIG. 1. In general, the verification that the design-in-progress satisfies the requirements of the various design rules is performed by computer-aided-design (CAD) systems such as design rule checking decks (DRC decks) or design rules manuals (DRM). These can be "stand-alone" devices or may be integrated into the overall system which is used to produce the IC design as well as verifying/optimizing it.

As new manufacturing technologies are being adopted and, notably as lithography wavelengths drop below 90 nm, it has been found that systematic yield loss is increasing. More particularly, binary design rules, which define yield as 100% when geometrical parameters respect certain limit values, are ceasing to accurately reflect reality. This leads to a number of disadvantages:

a) systematic yield loss cannot be accurately evaluated during design, and so it cannot be optimally reduced, b) designs are not optimized with respect to yield versus area on the wafer, thus potentially wasting space on the wafer (and increasing costs), and c) in a case where there are conflicting design rules for the geometry of a feature or circuit, there is no mechanism for resolving the conflict. This is illustrated in FIG. 3, which shows (using a dotted line) how yield is assumed to vary with feature size according to a design rule A and shows (using a solid line) how yield is assumed to vary with features size according to a design rule B. If both design rules A and B are to be respected then the feature size must be set somewhere in the hatched region. However, it is impossible to tell which specific value of feature size is the best.

For the above reasons, existing automated systems which apply conventional binary rules when performing verification of the circuit and/or layout are not able to optimize the design from the point of view of product manufacturability.

The present inventor has realized that in the vicinity of the limits specified by design rules the relationship between systematic yield loss (or yield) and feature geometry should be modelled using a non-binary function. Thus, even if a geometrical parameter relating to an integrated circuit feature and/or to an IP and/or to the circuit itself is set to a value which respects a particular design rule and is a certain distance away from the limit specified in that rule, it is still appropriate to take systematic yield loss into account.

This principle can be better understood from a consideration of FIG. 4. FIG. 4 shows various different types of function that could be used to model the way in which yield (and, hence, systematic yield loss) varies as a geometric parameter (in this example, feature size) varies.

According to the non-binary models used in the invention, the yield curve has a first flat portion where yield remains static at 0% and then, at the DRM limit value, yield begins to increase. After a period of increase, the yield curve becomes flat once more, with yield now remaining static at 100%. The start point of this second flat portion in the yield curve corresponds approximately to the DFM limit (it will be recalled that the DFM limit is defined as the value at which it is considered that the IC manufacturing process will have negligible effect on yield). This second flat portion of the yield curve can be considered to correspond to a "DFM-compliant zone".

The intermediate portion of the yield curve, which connects the two flat end portions together, can have any of a number of different shapes, depending upon the particular geometric parameter/design rule being modelled. FIG. 4a illustrates the case where the intermediate portion of the yield curve is linear. FIG. 4b illustrates the case where the intermediate portion of the yield curve is stepped (the height of the steps may or may not all be the same). FIG. 4c illustrates the case where the intermediate portion of the yield curve is non-monotonal. Finally, FIG. 4d illustrates the case where the intermediate portion of the yield curve follows the shape of an exponential curve.

In the preferred embodiments of the present invention, yield (and/or systematic yield loss) is modelled, in the vicinity of the limits specified by design rules, using a selected non-binary function. It is to be understood that the present invention is not limited to using the non-binary functions illustrated in FIGS. 4a to 4d. In particular, the following main families of non-binary functions can be used: stepped functions, monotonal functions (for example, linear and exponential functions), and non monotonal functions (for example, polynomial functions).

Typically, simulations are performed in order to identify the appropriate non-binary function to use for modelling yield (and/or systematic yield loss) close to the design rule limit in any particular case.

By modelling yield (or systematic yield loss) in a more realistic manner, the preferred embodiments of the present invention enable systematic yield loss to be calculated accurately. Thus, the method and system according to the preferred embodiments of the present invention:
enable systematic yield loss to be evaluated accurately during design, and so enable it to be reduced optimally,
enable designs to be optimized with respect to yield versus area on the wafer, thus making efficient use of the space on the wafer (and reducing costs), and
enable conflict to be resolved in a case where there are conflicting design rules for the geometry of a feature or circuit. In this regard see in FIG. 5, which shows (using a dotted line) how yield is assumed to vary with feature size according to a first non-binary design rule A', and shows (using a solid line) how yield is assumed to vary with features size according to a second non-binary design rule B'. If both design rules A' and B' are to be respected then the feature size must be set somewhere in the hatched region. This time, it is possible to identify an optimum value for the feature size, as indicated by a dot-chain line in FIG. 5.

Thus, the preferred embodiments of the invention make it possible to produce designs which achieve better product manufacturability, thereby increasing yield and so reducing the cost of each chip.

An embodiment of the invention will now be described, by way of example, with reference to the drawings, of which:

FIG. 4 is a set of graphs illustrating how yield varies with feature size according to different examples of non-binary design rules applied in embodiments of the present invention, in which:

According to the present invention, a non-binary model of systematic yield loss is used in order to model the variation of systematic yield loss in the vicinity of a limit value (specified in design rules) set on some geometric parameter. The geometric parameter is not particularly limited in nature. It could be defined at feature level, or at the level of an IP or circuit. Also, the geometric parameter could be one of the dimensions of a feature, the spacing between two features, the degree of overlap of two features, the degree of enclosure of one feature by another, the redundancy of a feature, the density of a feature, etc.

The appropriate non-binary yield curve to use for a given design rule can be found, for example, from simulations. More particularly, for the preferred embodiment of the invention, the yield curve can be extracted from a silicon test vehicle or from a virtual test vehicle.

For a silicon test vehicle, a collection of all the typical configurations found on a design is generated and the electrical characteristics measured. Such test vehicles are already well-known and readily available in commerce.

For a virtual test vehicle, the actual process variation in the fabrication plant is measured and a device simulator is used to extract the corresponding electrical characteristics of these configurations.

In both cases, it is possible from the electrical characteristics to define a pass/fail condition (dependent on design sensitivity) and, thus, to determine the desired yield (systematic yield loss) curve information.

When systematic yield loss is modelled using a non-binary function, it becomes possible to determine a value for yield (and, by extension, systematic yield loss) when the geometric parameter in question takes a value compliant with the design rule but close to the DRM limit. This will be seen more clearly from FIG. 6.

Figure 6:
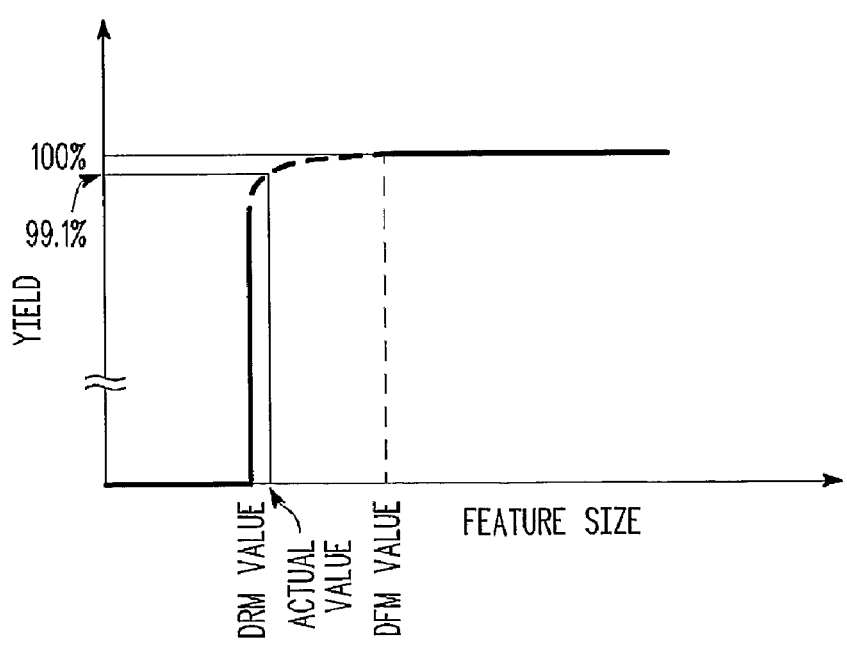
FIG. 6 is a graph showing how yield (and, hence, systematic yield loss) can be determined for geometric parameters close to the DRM limit value, using a non-binary model of systematic yield loss.

FIG. 6 illustrates the case where the systematic yield loss is modelled using a function which varies according to a monotonal function (in this particular example, in an exponential manner) as feature size increases from the DRM limit value to the DFM limit value.

As illustrated in FIG. 6, in order to determine what is the systematic yield loss associated with a particular value of feature size, this particular value of feature size is inserted into the non-binary model in order to determine a value for yield (and, by extension, systematic yield loss). The example of FIG. 6 concerns a case where the actual value of feature size specified in an IC design would produce a yield of 99.1%, that is, there would be systematic yield losses of 0.9%.

By applying a non-binary model to model the way in which systematic yield loss varies with the values taken by a geometric parameter, the present invention enables systematic yield loss to be calculated in circumstances where this has not previously been possible. This opens up the possibility of taking into account systematic yield losses when seeking to optimize a design, when evaluating a "cost function" associated with a particular IC design, etc. This latter cost function can be used to evaluate and/or compare the quality or manufacturability of different IC designs. Typically, the cost function would take into account factors such as the area on a silicon wafer that would be occupied by the IC design, systematic yield losses associated with the IC design, timing failures and/or the liability of a configuration to give rise to timing failures, signal integrity (effect of crosstalk), power drain, etc.

A design rule checking deck (DRC deck) according to one preferred embodiment of the present invention will now be described with reference to FIGS. 7 and 8.

Figure 7:
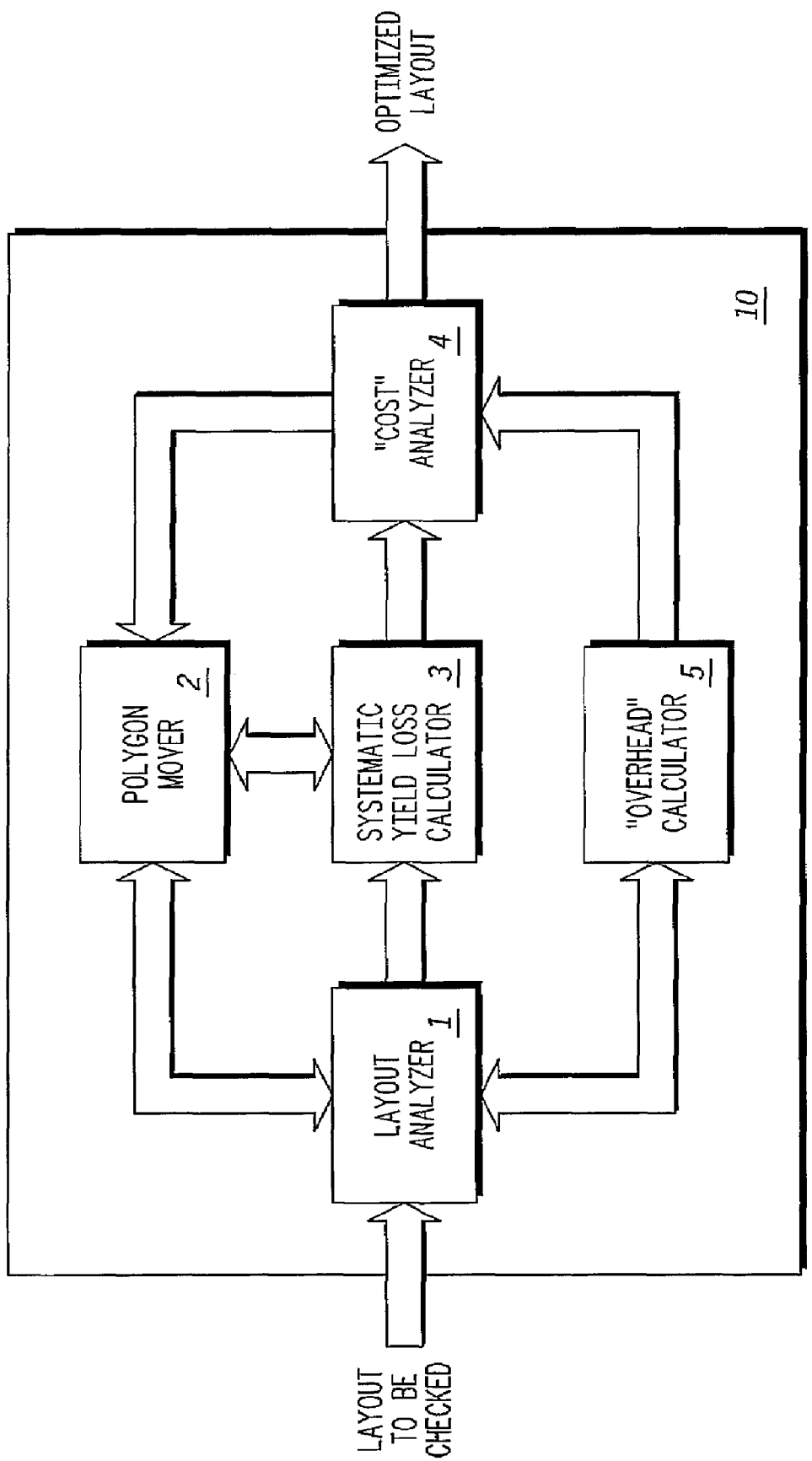
FIG. 7 is a block diagram which illustrates, schematically, the main elements of a design rule checking deck according to a preferred embodiment of the present invention.

FIG. 7 shows one example of the main functional blocks involved in the DRC deck 10. It is to be understood that, in practice, the DRC deck will often be implemented using a suitably-programmed computer or CAD system, such that the different blocks shown in FIG. 7 will often correspond to software routines or modules. The different blocks in FIG. 7 are identified merely to aid understanding of the various functions that are performed in the overall system. Moreover, the distribution of functions between the various blocks shown in FIG. 7 could be changed and/or these functions could be performed using a lesser or greater number of blocks than that shown in FIG. 7.

The design rule checking system of the embodiment shown in FIG. 7 is adapted not just to verify whether an input IC design complies with a given set of design rules, but also to optimize the IC design with respect to those rules and a number of manufacturability issues. However, it is to be understood that the present invention is not limited to systems in which the IC design is optimized, the invention could be applied in systems which merely check compliance of an IC design with a set of design rules and/or which determine the likely yield for a given IC design.

Furthermore, the design rule checking system of FIG. 7 can be integrated into a CAD system which generates the IC design that is to be checked.

Figure 8:
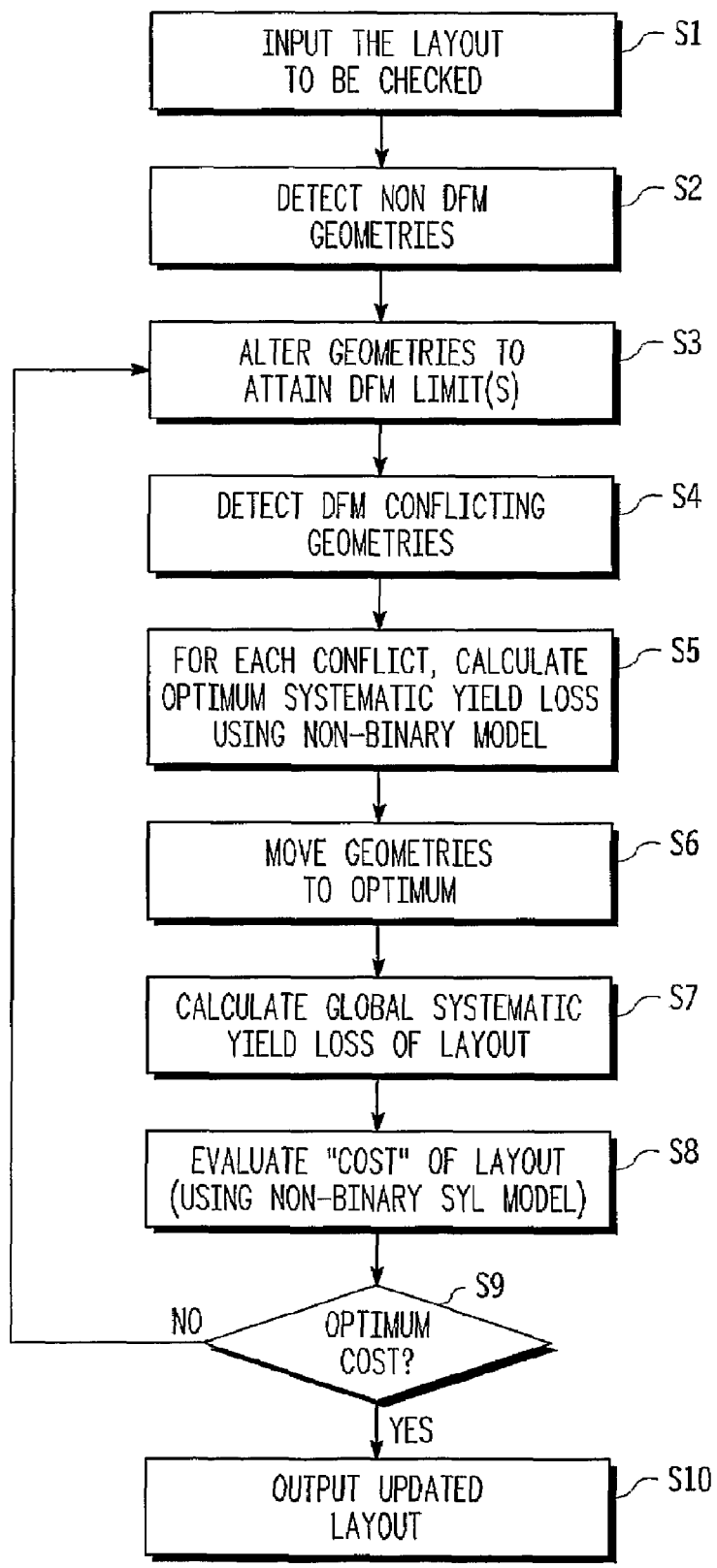
FIG. 8 is a flow diagram illustrating the steps involved in optimizing the design of a semiconductor integrated circuit using the DRC checking deck of FIG. 7.

The design rule checking system 10 of FIG. 7 includes a layout analyzer 1, which analyzes the layout of the IC design that is input to the system—see steps S1 and S2 of the flow diagram shown in FIG. 8. The layout analyzer 1 analyzes the input IC circuit layout to determine its compliance (or not) with limits specified according to design for manufacturability principles, that is DFM limits that are set a certain margin away from DRM limits specified in a set of one or more design rules. In other words, the layout analyzer 1 checks whether each geometry corresponds to a position in the "DFM-compliant zone" of the appropriate yield curve. If the layout analyzer 1 detects geometries which correspond to positions that are not in the "DFM-compliant zone" of the yield curve, then the non-compliant geometries are noted in a database.

Once the layout analyzer 1 has checked all geometries in the input layout, and completed a list of non-DFM-compliant geometries, a polygon mover 2 attempts to render the non-compliant geometries compliant with the DFM limits, by changing the dimensions and/or positions of polygons in the input design (step S3 of FIG. 8).

Typically, the polygon mover 2 only moves polygons relating to the non-DFM-compliant geometries listed in the database produced by the layout analyzer 1. In general, this involves moving polygons so as to alter the values of their geometric parameter(s) so as to attain (or, at least, more closely approach) the DFM value(s) specified in the applicable design rule(s).

However, in certain embodiments of the invention, the polygon mover 2 also shifts polygons corresponding to DFM-compliant geometries—in this case so as to reduce the distance between their geometric parameters and the applicable DFM limit(s) thus, potentially, freeing space for the DFM adjustments relating to the non-DFM-compliant geometries.

Figure 1:
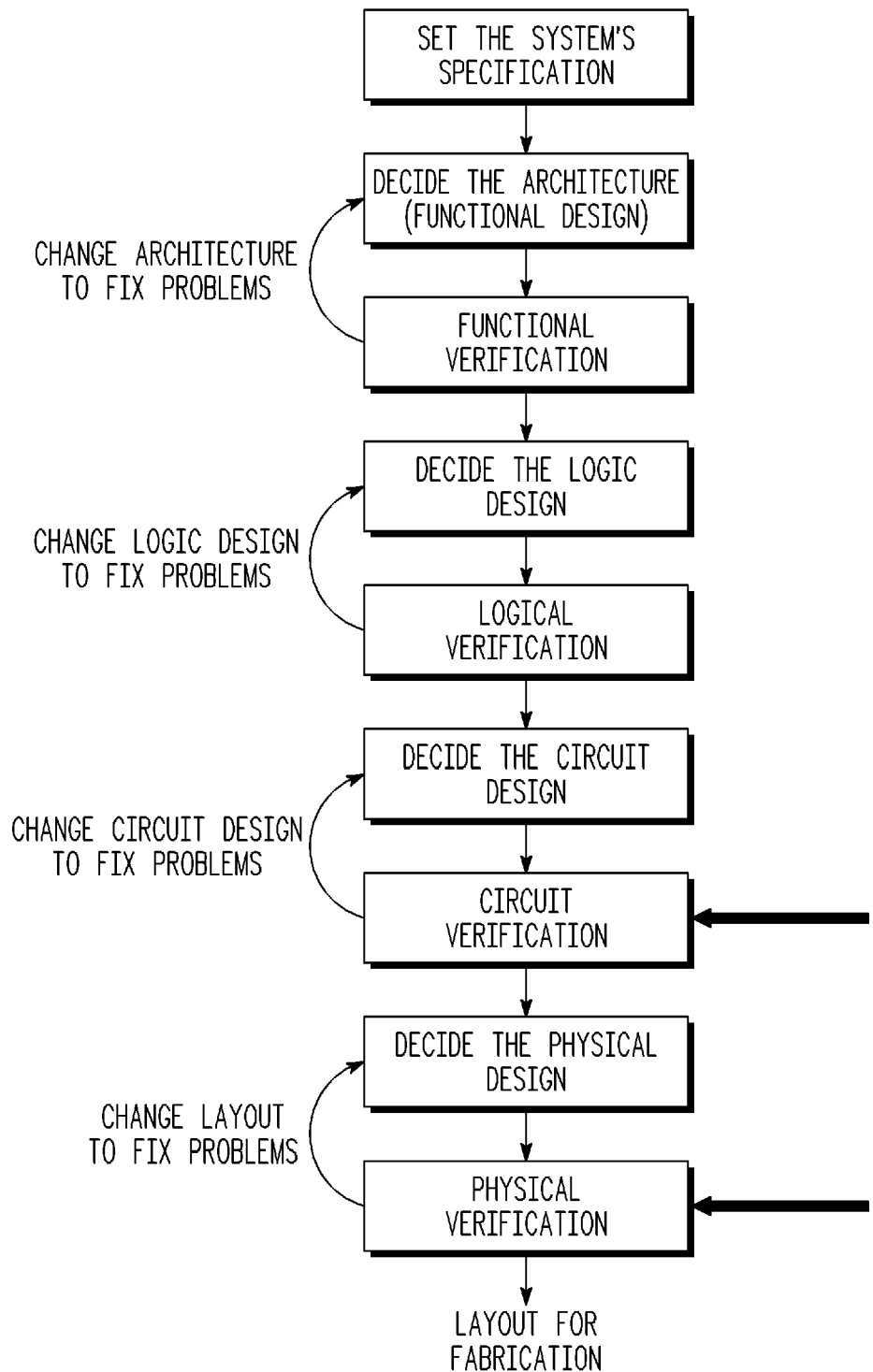
FIG. 1 is a flow diagram outlining the main stages in development of the design of a semiconductor integrated circuit.
Figure 2:
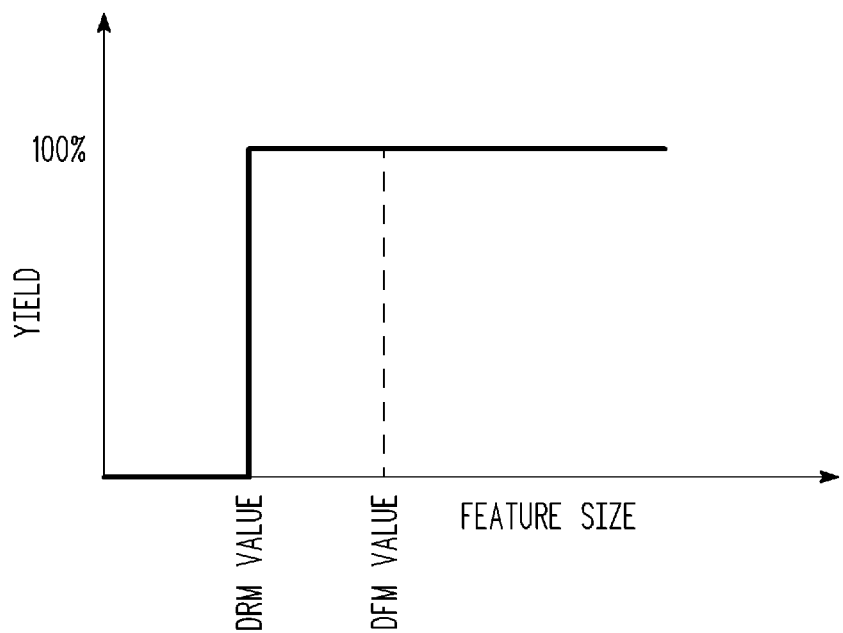
FIG. 2 is a graph illustrating how yield varies with feature size according to an example of a conventional binary design rule.
Figure 3:
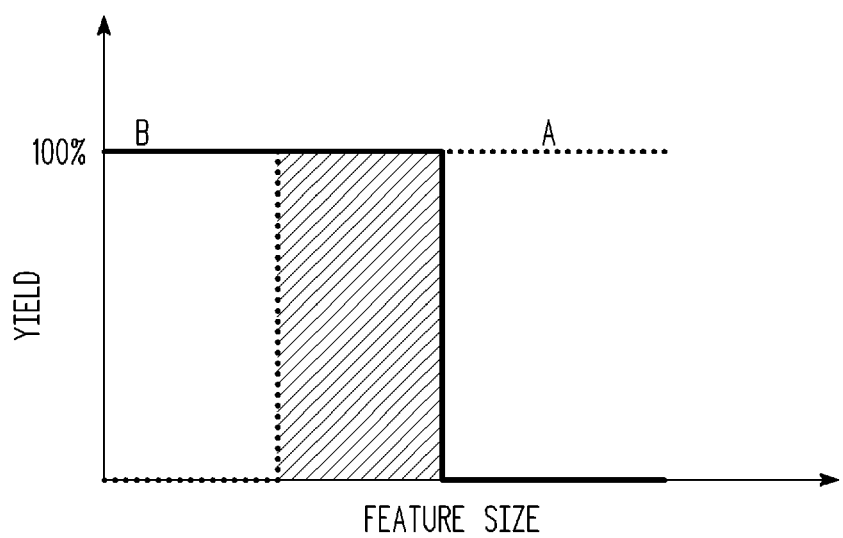
FIG. 3 is a graph showing how conflicts between conventional binary design rules can be resolved, without an optimal solution.
Figure 4A:
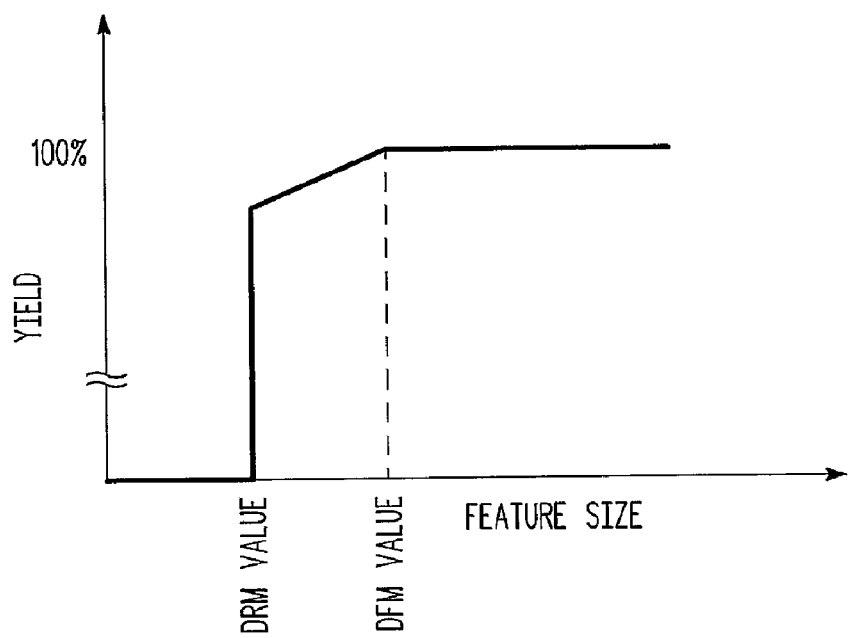
FIG. 4a illustrates a linear function.
Figure 4B:
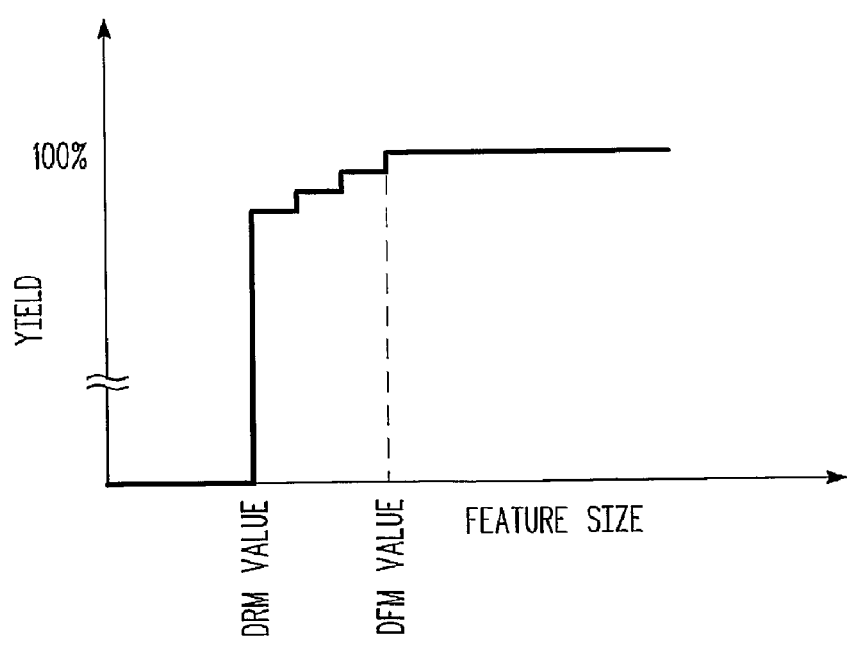
FIG. 4b illustrates a stepped function.
Figure 4C:
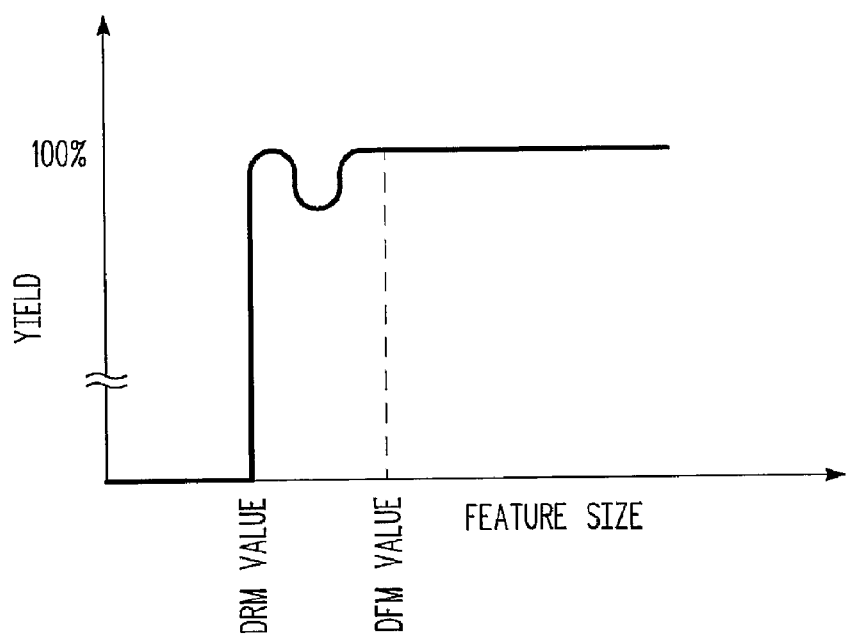
FIG. 4c illustrates a non-monotonal function.
Figure 4D:
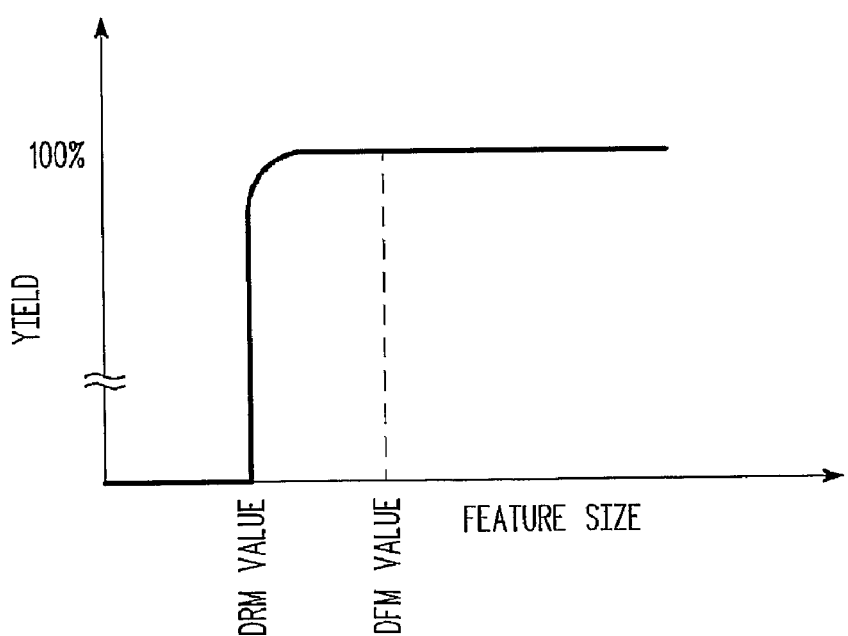
FIG. 4d illustrates a monotonal function.
Figure 5:
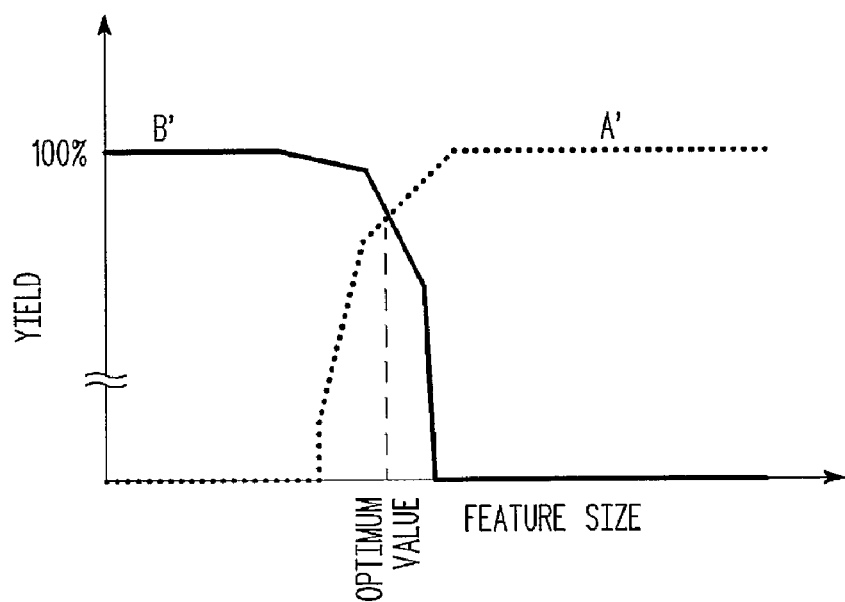
FIG. 5 is a graph showing how conflicts between non-binary design rules can be resolved in an optimal manner, according to an embodiment of the present invention.

When the polygon mover 2 has adjusted the positions and/or dimensions of polygons so as to render the non-DFM-compliant geometries DFM-compliant (or more close to being DFM-compliant), the layout analyzer 1 then analyzes the design, as modified by the polygon mover 2, so as to detect any geometries for which different design rules set conflicting requirements (such as design rules A' and B' of FIG. 5)—see step S4 of FIG. 8. Once again, the layout analyzer 1 produces a list or database, this time of geometries which are subject to conflicting design rules.

The design rule checking deck 10 includes a systematic yield loss calculator 3. For each DFM conflict, this calculator 3 models the yield versus geometric-parameter (e.g. feature size) curve for the conflicting design rules. The systematic yield loss calculator 3 models each design rule using a corresponding non-binary yield curve that has been determined beforehand (e.g. using a silicon test vehicle). In step S5 of FIG. 8, the systematic yield loss calculator 3 then finds the optimum value of the geometric parameter by determining where the two yield curves cross (see FIG. 5).

The polygon mover 2 changes the dimensions and/or positions of polygons in the current version of the design, so as to set the appropriate geometric parameters to (or closer to) the corresponding optimum values found by the systematic yield loss calculator 3 (in step S6 of FIG. 8).

After the geometries have been adjusted by the polygon mover 2 in step S6 of FIG. 8, the systematic yield loss calculator 3 determines an overall value for systematic yield loss for the current version of the design (that is, the input design as modified by the polygon mover 2 in steps S3 and S6). In order to do this, the systematic yield loss calculator 3 models the yield curve (or systematic yield loss curve) for each design rule using the appropriate non-binary function determined beforehand. For each design rule/geometry, the yield can be directly determined from the modelled yield curve, as shown in FIG. 6. The systematic yield loss calculator 3 multiplies together the yield values calculated for each design rule/geometry, in order to arrive at a global value for yield (and, by extension, systematic yield loss) for the design as a whole—see step S7 of FIG. 8.

In step S8 of FIG. 8, a cost analyzer 4 present in the design rule checking deck 10 next determines the value of a "cost" parameter associated with the current version of the design. This "cost" parameter is a measure of the attractiveness of this design from the point of view of its manufacturability and other considerations. The cost function will take into account the global value of systematic yield loss calculated by the calculator 3 (based on non-binary yield models). However, it is advantageous for other factors to be taken into account also: such as, the area on a silicon wafer that would be occupied by the IC design, systematic yield losses associated with the IC design, timing failures and/or the liability of a configuration to give rise to timing failures, signal integrity (effect of crosstalk), power drain, etc. The "cost" associated with these other factors can be designated an "overhead" and it may be calculated using a special module 5 in the design rule checking deck 10, which communicates with the cost analyzer 4.

When the cost analyzer 4 has determined a "cost" associated with the current version of the design, it next decides whether or not this "cost" represents the optimum value (in step S9 of FIG. 8). If the "cost" associated with the current design is considered to be an optimum value, then there is no need to seek further to optimize the design. Details of the current design can be output (in any suitable form) as the optimized design for the circuit in question (in step S10 of FIG. 8).

On the other hand, if the cost associated with the current design is not judged to take an optimum value, another attempt is made to optimize the circuit design. Preferably, the system flow returns to step S3 of FIG. 8, in other words, the polygon mover 2 once again changes the dimensions and/or positions of polygons so that DFM limit values are respected. Thus, depending on the position and nature of constraints layers the sizing and moving of polygon will vary, which is why each iteration is different from the previous one. The optimization loop of steps S3 to S9 of FIG. 8 is repeated a number of times (iterations) until an optimum value of the "cost" function is achieved.

In step S9 of FIG. 8, the cost analyzer 4 can use one of a number of different approaches when deciding whether or not the "cost" function calculated for the current design represents an optimum value.

One approach seeks to optimize the design from the point of view both of manufacturability and of the other metrics involved in calculation of the "overhead" (for example: signal integrity, power, etc.). In this case, if the cost function is taking a relatively large value because, for example, of a problem with timing errors, the cost analyzer 4 of the design rule checking deck 10 initiates an iteration of an optimization loop which seeks to optimize the design from the point of view of timing. The present invention is not primarily concerned with optimization of a design from the point of view of timing, or any of the other metrics involved in the "overhead", and so no detailed description will be given of this kind of optimization loop. Suffice it to say that the optimization of the design from the point of view of timing (or the other metrics involved in the "overhead") can be performed using the same modules as those shown in FIG. 7, e.g. the layout analyzer 1 and polygon mover 2, or using different modules (not represented in FIG. 7).

Another approach that can be taken by the cost analyzer 4 when determining whether or not the "cost" associated with the current version of the design is optimal, can consist in comparing the current "cost" with the value produced in previous iterations of the optimization-for-manufacturability loop S3 to S9 of FIG. 8. Usually, in early iterations the percentage change in "cost" from one iteration of the optimization-for-manufacturability loop S3 to S9 to the next will be high, gradually reducing as the number of iterations increases. The cost analyzer 4 may be set up such that it compares the percentage change in "cost" between the current iteration and the previous iteration with a threshold value, and considers that the current "cost" is optimal when this percentage change falls below the threshold value.

It should be noted that, in general, when the design rule checking deck 10 performs an iteration seeking to optimize the design from the point of view of manufacturability, the design improves from other points of view also (e.g. timing, signal integrity, etc.). This may be because of the use of less aggressive settings for design parameters when a design is developed taking manufacturability into account.

Although the present invention has been described above with reference to certain particular preferred embodiments, it is to be understood that the invention is not limited by reference to the specific details of those preferred embodiments. More specifically, the person skilled in the art will readily appreciate that modifications and developments can be made in the preferred embodiments without departing from the scope of the invention as defined in the accompanying claims.

For example, although the application of design for manufacturability principles has been discussed above with reference to VLSI circuits such as a "system on a chip" circuit, the invention is not limited to application in the design, verification and/or optimization of such circuits.

Moreover, although the annexed graphs show yield curves for to design rules relating to the geometry of circuits at feature level, the invention relates more generally to design rules holding on geometric parameters at different levels: for example, feature level, IP level, circuit level.

Further, although the above-described preferred embodiment relates to a design rule checking deck, it is to be understood that the present invention is applicable more generally in systems or devices which generate, verify and/or optimize circuit designs.

Additionally, although the above-described preferred embodiment uses a single module to produce an "overhead" value associated with the attractiveness of the design from the point of view of factors other than manufacturability (e.g. timing, signal integrity, etc.), and a cost analyzer module to combine that overhead with the cost of the design in terms of manufacturability, a global value of the cost function can be produced in other ways. For example, separate modules can be used to determine a "cost" associated with each factor (manufacturability, signal integrity, timing, power, etc.) and a combining module can then make an appropriate combination of these contributions into a global "cost" function. The combination can be made in a variety of ways including, but not limited to, making a weighted sum of the individual "cost" contributions for the respective different factors.

The invention claimed is:

1. A design rule checking system for checking compliance of an integrated circuit design with a plurality of design rules,
    said integrated circuit design comprising design data defining a plurality of elements in the integrated circuit,
        said design data comprising data specifying respective values for a set of geometric parameters descriptive of the geometry of one or more elements in the integrated circuit,
        said set of geometric parameters including at least a first geometric parameter, and
        said plurality of design rules comprising a plurality of first design rules specifying respective limit values for said first geometric parameter, and yield loss occurs when said integrated circuit is manufactured according to said integrated circuit design, said yield loss including systematic yield loss,
    the design rule checking system comprising:
    a conflict-detection unit for detecting conflict between at least two of said first design rules;
    a systematic-yield-loss modelling unit for applying, in respect of each of said at least two first design rules, a respective model indicating a relationship between the value of said first geometric parameter of said integrated circuit design and a corresponding value of systematic yield loss when the integrated circuit is manufactured,
    the systematic-yield-loss modelling unit including a calculation unit adapted to calculate, for different possible values of said first geometric parameter, a value of systematic yield loss according to each of said non-binary models;
    and
    a value-setting unit for selecting a value for said first geometric parameter by determining the lowest value of systematic yield loss calculated by said calculation unit for a value of said first geometric parameter that respects said conflicting first design rules and selecting the value of the first geometric parameter that corresponds to said lowest value of systematic yield loss, and for controlling said design data to set the first geometric parameter to said selected value.

2. The design rule checking system of claim 1, wherein said design data specifies respective values for a plurality of different geometric parameters and said plurality of design rules comprise a plurality of design rules specifying respective different limit values for said plurality of geometric parameters, the calculation unit is adapted to apply respective non-binary models modelling the variation of systematic yield loss with respect to a said plurality of geometric parameters having limit values specified by said plurality of design rules, and the calculation unit is adapted to calculate the overall systematic yield loss for at least a portion of the integrated circuit design by calculating the systematic yield loss for each of said plurality of geometric parameters according to the respective model, and determining the product of the yield values corresponding to the calculated losses.

3. The design rule checking system of claim 2, wherein the systematic-yield-loss modelling unit is adapted to apply non-binary models of systematic yield loss in which the variation in yield between a first limit value specified in the corresponding design rule and a second limit value spaced apart from the first limit value by a safety margin, is modelled using a function selected from a group consisting of stepped functions, non-monotonal functions and monotonal functions.

4. The design rule checking system of claim 2 further comprising a cost-calculation unit for calculating a cost function indicative of properties of said integrated circuit design including the manufacturability of said integrated circuit design, and a design-alteration unit for altering said integrated circuit design whereby to optimize the value of said cost function.

5. The design rule checking system of claim 2, and further comprising:
    a layout analyzer adapted to identify which geometries in said integrated circuit design fail to comply with design for manufacturability limits corresponding to limit values set by said one or more design rules; and
    a polygon mover for changing the dimension(s) and/or position(s) of one or more polygons in the input design so as to improve the compliance of the geometries identified by the layout analyzer with said design for manufacturability limits.

6. The design rule checking system of claim 1, wherein the systematic-yield-loss modelling unit is adapted to apply non-binary models of systematic yield loss in which the variation in yield between a first limit value specified in the corresponding design rule and a second limit value spaced apart from the first limit value by a safety margin, is modelled using a function selected from a group consisting of stepped functions, non-monotonal functions and monotonal functions.

7. The design rule checking system of claim 6 further comprising a cost-calculation unit for calculating a cost function indicative of properties of said integrated circuit design including the manufacturability of said integrated circuit design, and a design-alteration unit for altering said integrated circuit design whereby to optimize the value of said cost function.

8. The design rule checking system of claim 6, and further comprising:
    a layout analyzer adapted to identify which geometries in said integrated circuit design fail to comply with design for manufacturability limits corresponding to limit values set by said one or more design rules; and
    a polygon mover for changing the dimension(s) and/or position(s) of one or more polygons in the input design so as to improve the compliance of the geometries identified by the layout analyzer with said design for manufacturability limits.

9. The design rule checking system of claim 1 further comprising a cost-calculation unit for calculating a cost function indicative of properties of said integrated circuit design including the manufacturability of said integrated circuit design, and a design-alteration unit for altering said integrated circuit design whereby to optimize the value of said cost function.

10. The design rule checking system of claim 9, and further comprising:
    a layout analyzer adapted to identify which geometries in said integrated circuit design fail to comply with design for manufacturability limits corresponding to limit values set by said one or more design rules; and
    a polygon mover for changing the dimension(s) and/or position(s) of one or more polygons in the input design so as to improve the compliance of the geometries identified by the layout analyzer with said design for manufacturability limits.

11. The design rule checking system claim 1, and further comprising:
    a layout analyzer adapted to identify which geometries in said integrated circuit design fail to comply with design for manufacturability limits corresponding to limit values set by said one or more design rules; and
    a polygon mover for changing the dimension(s) and/or position(s) of one or more polygons in the input design so as to improve the compliance of the geometries identified by the layout analyzer with said design for manufacturability limits.

12. The design rule checking system of claim 11, wherein: the polygon mover is arranged such that, in the case where the conflict detection unit detects a conflict between said first design rules specifying respective limit values for said first geometric parameter and the value-setting unit selects a value for the first geometric parameter, the polygon mover changes the dimension(s) and/or position(s) of one or more polygons in said integrated circuit design so as to set said first geometric parameter to the selected value.

13. An integrated-circuit-design verification system comprising the design rule checking system of claim 11.

14. An integrated-circuit-design optimization system comprising the design rule checking system of claim 11.

15. A design rule checking method for checking compliance of an integrated circuit design with a plurality of design rules, said integrated circuit design comprising design data defining a plurality of elements in the integrated circuit, said design data comprising data specifying respective values for a set of geometric parameters descriptive of the geometry of one or more elements in the integrated circuit, said set of geometric parameters including at least a first geometric parameter, and said plurality of design rules comprising a plurality of first design rules specifying respective limit values for said first geometric parameter, and yield loss occurs when said integrated circuit is manufactured according to said integrated circuit design, said yield loss including systematic yield loss, the design rule checking method comprising the steps of:

detecting conflict between at least two of said first design rules;

in respect of each of said at least two first design rules, applying a respective non-binary model indicating a relationship between the value of said first geometric parameter of said integrated circuit design and a corresponding value of systematic yield loss when the integrated circuit is manufactured, including calculating, for different possible values of said first geometric parameter, a value of systematic yield loss according to each of said applied models;

selecting a value for said first geometric parameter by determining the lowest value of systematic yield loss calculated in said calculating step for a value of said first geometric parameter that respects said conflicting first design rules and selecting the value of the first geometric parameter that corresponds to said lowest value of systematic yield loss by a design rule checking system implemented with a computer or CAD system; and controlling said design data to set the first geometric parameter to said selected value.

* * * * *